US011955325B1

(12) United States Patent
Hikosaka et al.

(10) Patent No.: US 11,955,325 B1
(45) Date of Patent: Apr. 9, 2024

(54) ELECTRON MULTIPLIER AND PHOTOELECTRON MULTIPLIER INCLUDING SAME

(71) Applicant: HAMAMATSU PHOTONICS K.K., Hamamatsu (JP)

(72) Inventors: Sho Hikosaka, Hamamatsu (JP); Takahiro Shibata, Hamamatsu (JP); Yuki Nishimura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/768,961

(22) PCT Filed: Feb. 19, 2020

(86) PCT No.: PCT/JP2020/006643
§ 371 (c)(1),
(2) Date: Apr. 14, 2022

(87) PCT Pub. No.: WO2021/131084
PCT Pub. Date: Jul. 1, 2021

(30) Foreign Application Priority Data

Dec. 27, 2019 (JP) ................................ 2019-239361

(51) Int. Cl.
*H01J 43/30* (2006.01)
*H01J 43/20* (2006.01)

(52) U.S. Cl.
CPC .............. *H01J 43/30* (2013.01); *H01J 43/20* (2013.01)

(58) Field of Classification Search
CPC ................................. H01J 43/30; H01J 43/20
See application file for complete search history.

(56) References Cited

U.S. PATENT DOCUMENTS 2,922,048 A 1/1960 Glass
3,450,921 A 6/1969 Guillaume
(Continued)

FOREIGN PATENT DOCUMENTS

GB 1155813 A 6/1969
JP S47-048188 B1 12/1972
(Continued)

OTHER PUBLICATIONS

International Preliminary Report on Patentability dated Jul. 7, 2022 for PCT/JP2020/006643.

*Primary Examiner* — Abdullah A Riyami
*Assistant Examiner* — Syed M Kaiser
(74) *Attorney, Agent, or Firm* — Faegre Drinker Biddle & Reath LLP

(57) ABSTRACT

The present embodiment relates to an electron multiplier or the like having a structure for realizing fast response characteristics as compared with the related art, and the electron multiplier includes at least a dynode unit, a stem, a coaxial cable, a conductive member, and a capacitor. The dynode unit includes multiple-stage dynodes, an anode, and a pair of insulating support members. An end portion of an outer conductor is drawn into the dynode unit together with an exposed portion of an inner conductor constituting a part of one end portion of the coaxial cable. With this configuration, it is possible to arrange the capacitor in a space between the dynode unit and the stem, and it is possible to fix the exposed portion of the inner conductor to a portion of the anode interposed between the pair of insulating support members.

9 Claims, 9 Drawing Sheets

(56) References Cited

U.S. PATENT DOCUMENTS

| | | | | |
|---|---|---|---|---|
| 3,885,178 | A | 5/1975 | Goehner | |
| 2008/0088234 | A1* | 4/2008 | Ohmura .................. | H01J 43/26<br>313/532 |
| 2011/0095174 | A1* | 4/2011 | Suyama .................. | H01J 43/22<br>250/281 |
| 2012/0037802 | A1* | 2/2012 | Kneedler .............. | H01J 37/244<br>250/306 |

FOREIGN PATENT DOCUMENTS

| | | | | | |
|---|---|---|---|---|---|
| JP | S55-046203 | A | | 3/1980 | |
| JP | H06-028997 | A | | 2/1994 | |
| JP | 2002-042719 | A | | 2/2002 | |
| JP | 2008-535147 | A | | 8/2008 | |
| JP | 2009289693 | A | * | 12/2009 | .............. H01J 43/22 |
| WO | WO-2006/112143 | A2 | | 10/2006 | |
| WO | WO-2021131084 | A1 | * | 7/2021 | .............. H01J 43/20 |

* cited by examiner

ELECTRON MULTIPLIER AND PHOTOELECTRON MULTIPLIER INCLUDING SAME

TECHNICAL FIELD

The present invention relates to an electron multiplier and a photoelectron multiplier (photomultiplier).

BACKGROUND ART

An electron multiplier having multiple-stage dynodes that cascade-multiplies secondary electrons in response to an input of electrons is widely used as a main part of various detectors operating in a vacuum state (depressurized state), such as a photoelectron multiplier and a charged particle detector applied to a mass analyzer. For example, a technique for suppressing reflection of a high-frequency component and as a result, reducing ringing of an output signal waveform by arranging a capacitor between a final-stage dynode facing an anode and another dynode adjacent to the final-stage dynode is known as a technique for realizing a fast response of an electron multiplier applicable to such a wide range of applications. It is more effective to arrange a capacitor connected to each dynode directly or by a wire sufficiently shorter than a lead wire, and thus, the capacitor is housed in a sealed container together with the multiple-stage dynodes and the anode in the photoelectron multiplier disclosed in Patent Documents 1 and 2.

CITATION LIST

Patent Literature

Patent Document 1: Japanese Patent Application Laid-Open No. S55-046203
Patent Document 2: U.S. Pat. No. 3,450,921
Patent Document 3: Japanese Patent No. 4573407 (Japanese Patent Application Laid-Open No. 2002-042719)

SUMMARY OF INVENTION

Technical Problem

The inventors have found the following problems as a result of examining the above-mentioned related art. For example, in the photoelectron multiplier of Patent Document 1, the capacitor is directly constructed by using a back surface of the final-stage dynode (the final-stage dynode functions as one electrode of the capacitor). On the other hand, connection of the capacitor to the dynode (adjacent dynode) adjacent to the final-stage dynode is realized by a lead wire. Specifically, one end of the lead wire is connected to another electrode of the capacitor constructed on the back surface of the final-stage dynode, and the other end of the lead wire is connected to a protrusion portion of the adjacent dynode protruding from an insulating plate gripping the adjacent dynode. When the capacitor and the dynode are connected by the lead wire as described above, there is a possibility that a sufficient ringing reduction effect cannot be obtained. The inner conductor (signal line) of the coaxial cable is also connected to the protrusion portion of the anode protruding from the insulating plate via the lead wire (having a cross-sectional area smaller than a cross-sectional area of the signal line), and it is difficult to obtain a sharper output signal waveform (fast response characteristics).

The photoelectron multiplier of Patent Document 2 includes a mesh-shaped collector and a shield electrode surrounding the final-stage dynode. The inner conductor (signal line) of the coaxial cable is connected not to the collector but to the final-stage dynode, and has a structure in which the collector and a ground potential are decoupled by the capacitor. In the photoelectron multiplier of Patent Document 2, the collector functions as the anode in a normal operation, but since a collector voltage fluctuates (is not stable) in a high-speed signal operation (instantaneous large current), the final-stage dynode set to a potential lower than a set potential of the collector is used as the anode as illustrated in the drawing. As described above, the invention of Patent Document 2 is intended to stably supply a voltage to the collector, and a structure for realizing fast response characteristics is not disclosed. That is, Patent Document 2 discloses a connection relationship between portions, but does not disclose a physical wiring structure (arrangement of portions, use of the lead wire as a connection member, or the like) at all, and it is unclear whether or not fast response characteristics can be realized only in such a wiring state.

For reference, in the photoelectron multiplier of Patent Document 3, a light shielding plate (conductive member) made of metal is housed in the sealed container. However, a potential of the light shielding plate is supplied via the lead wire drawn from the outside of the container, and the light shielding plate is not a component that can contribute to fast response characteristics.

The present invention has been made to solve the above-described problems, and an object of the present invention is to provide an electron multiplier having a structure for realizing fast response characteristics as compared with the related art, a photoelectron multiplier to which the electron multiplier is applicable, and a charged particle detector to which the electron multiplier is applicable.

Solution to Problem

An electron multiplier according to the present embodiment constitutes a main part of various detectors such as a photoelectron multiplier and a charged particle detector applied to a mass spectrometer, and mainly includes a dynode unit, a stem, a coaxial cable, a conductive member, and a capacitor. The dynode unit has a structure for cascade-multiplying a reached electron and extracting the electron as an electric signal, and specifically includes multiple-stage dynodes, an anode, and a pair of insulating support members. The multiple-stage dynodes cascade-multiplies the electron. The anode is an electrode that is set to a potential higher than a set potential of a final-stage dynode among the multiple-stage dynodes, and captures the electron emitted from the final-stage dynode. The pair of insulating support members integrally grips both at least the multiple-stage dynodes and the anode. The stem has a first surface and a second surface facing the first surface, and holds a plurality of lead pins in a penetrating state. The stem holds the dynode unit in a first-surface side space positioned on an opposite side of the second surface with respect to the first surface. The coaxial cable includes an inner conductor, an insulating material provided on an outer peripheral surface of the inner conductor, and an outer conductor provided on an outer peripheral surface of the insulating material. The entire coaxial cable may be provided in the first-surface side space, or at least one end portion may be provided in the first-surface side space by penetrating the stem. The conductive member is provided in the first-surface side space, and is set to the same potential as a potential of the final-stage dynode that directly supplies the multiplied electron to the anode. The capacitor is provided in the first-surface side space and is arranged on a wiring between the conductive member and the outer conductor of the coaxial cable.

In particular, in the electron multiplier having the above-described structure, an exposed portion of the inner conductor which constitutes a part of one end portion of the coaxial cable and is positioned in the first-surface side space in a state of being exposed from end portions of the insulating material and the outer conductor, is directly or indirectly fixed to a portion of the anode interposed between the pair of insulating support members. With this configuration, both the fixing of the coaxial cable and the anode with sufficient mechanical strength and the housing of the capacitor in the sealed container are made possible.

Each embodiment according to the present invention can be more sufficiently understood from the following detailed description and the accompanying drawings. These examples are given by way of illustration only and should not be considered as limiting the invention.

Further application scope of the present invention will be apparent from the following detailed description. However, the detailed description and the specific cases, while indicating preferred embodiments of the present invention, are given by way of illustration only, and it is obvious that various modifications and improvements within the scope of the present invention will be apparent to those skilled in the art from this detailed description.

Advantageous Effects of Invention

According to the electron multiplier according to the present embodiment, response characteristics are improved as compared with the related art by realizing a configuration in which one end portion (including the exposed portion of the inner conductor, the end portion of the insulating material, and the end portion of the outer conductor) of the coaxial cable is drawn into the dynode unit and the exposed portion of the inner conductor of the coaxial cable can be fixed to the anode. Structural deformation effective for suppressing the ringing of the output signal can be performed by drawing the end portion of the outer conductor of the coaxial cable into the dynode unit.

DESCRIPTION OF EMBODIMENTS

Details of Embodiment of Present Disclosure

Figure 1:
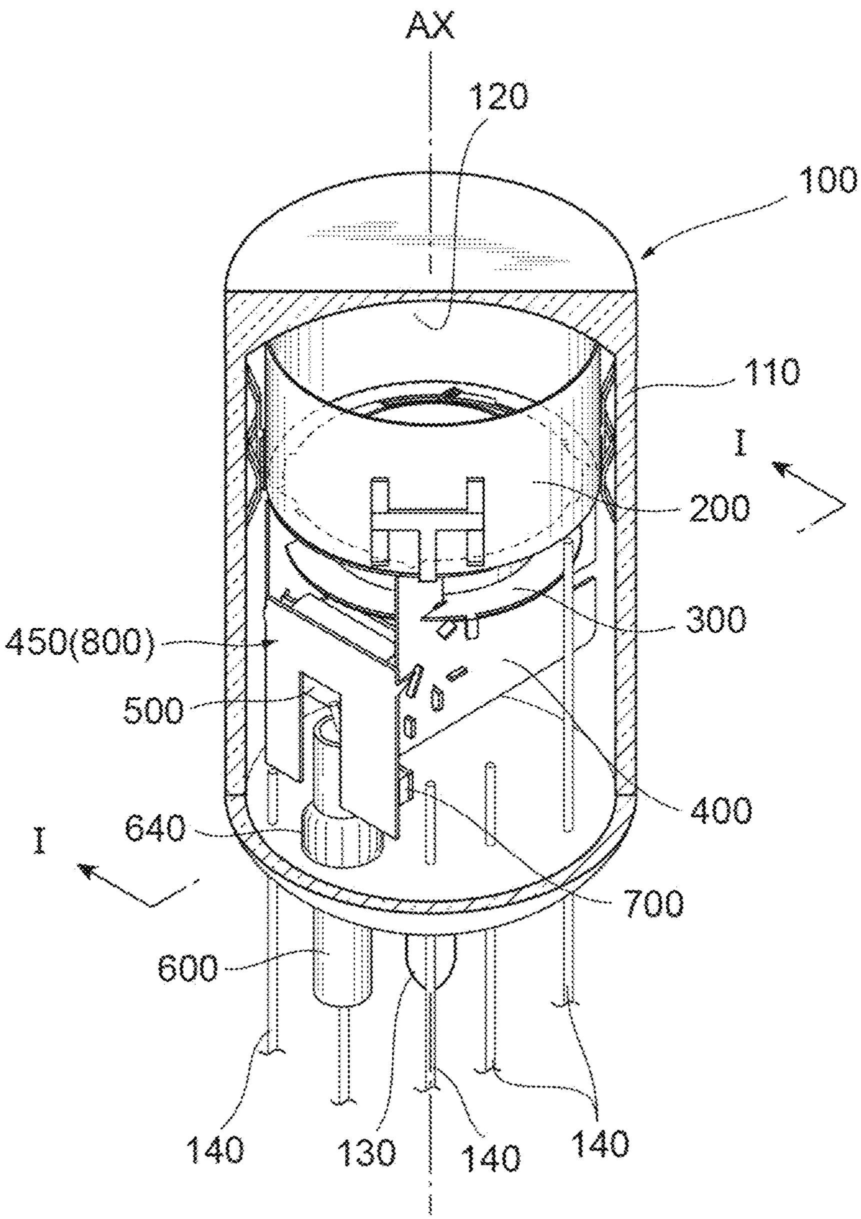
FIG. 1 is a partial breakaway view schematically illustrating an example of an internal structure of a photoelectron multiplier (an example of a photoelectron multiplier according to the present embodiment) as an example of a detector including an electron multiplier according to the present embodiment as a main part.

First, contents of an embodiment of the present disclosure will be individually listed and described.

(1) An electron multiplier according to the present embodiment constitutes a main part of various detectors such as a photoelectron multiplier and a charged particle detector applied to a mass spectrometer, and as one aspect thereof, mainly includes a dynode unit, a stem, a coaxial cable, a conductive member, and a capacitor. The dynode unit has a structure for cascade-multiplying a reached electron and extracting the electron as an electric signal, and specifically includes multiple-stage dynodes, an anode, and a pair of insulating support members. The multiple-stage dynodes cascade-multiplies the electron. The anode is an electrode that is set to a potential higher than a set potential of a final-stage dynode among the multiple-stage dynodes, and captures the electron emitted from the final-stage dynode. The pair of insulating support members integrally grips both at least the multiple-stage dynodes and the anode. The stem has a first surface and a second surface facing the first surface, and holds a plurality of lead pins in a penetrating state. The stem holds the dynode unit in a first-surface side space positioned on an opposite side of the second surface with respect to the first surface. The coaxial cable includes an inner conductor, an insulating material provided on an outer peripheral surface of the inner conductor, and an outer conductor provided on an outer peripheral surface of the insulating material. The entire coaxial cable may be provided in the first-surface side space, or at least one end portion may be provided in the first-surface side space by penetrating the stem. The conductive member is provided in the first-surface side space, and is set to the same potential as a potential of the final-stage dynode that directly supplies the multiplied electron to the anode. The capacitor is provided in the first-surface side space and is arranged on a wiring between the conductive member and the outer conductor of the coaxial cable. The conductive member may include one or more conductive elements.

In particular, in the electron multiplier having the above-described structure, the exposed portion of the inner conductor constituting a part of the one end portion of the coaxial cable, that is, the exposed portion of the inner conductor positioned in the first-surface side space in a state of being exposed from each end portion of the insulating material and the outer conductor is directly or indirectly fixed to the portion of the anode interposed between the pair of insulating support members. As described above, the one end portion (includes an exposed portion of the inner conductor, an end of the insulating material, and an end of the outer conductor) of the coaxial cable is drawn into the dynode unit (space interposed by the pair of insulating support members), and by realizing a configuration in which the exposed portion of the inner conductor of the coaxial cable can be fixed to the anode, the response characteristics are improved as compared with the related art. In addition, by drawing the outer conductor of the coaxial cable into the dynode unit, a configuration is realized in which a capacitor (decoupling capacitor) for suppressing reflection of a high-frequency component can be arranged in the vicinity of the final-stage dynode. This configuration enables structural deformation effective for suppressing ringing of the output signal.

Furthermore, both the photoelectron multiplier and the charged particle detector according to the present embodiment include an electron multiplier having the above-described structure (electron multiplier according to the present embodiment) as a main part. In particular, the photoelectron multiplier further includes a cathode and a sealed container in addition to the electron multiplier having the above-described structure. The cathode emits photoelectrons towards the dynode unit in response to the light input. The sealed container includes a main body (envelope) extending along a central axis and having an opening end defining an opening intersecting the central axis, and a stem functioning as the stem. The main body houses at least the cathode and the dynode unit. The stem is in close contact with the opening end in a state of closing the opening end. In addition, the coaxial cable is held by the stem in a state where the other end portion of the coaxial cable penetrates the stem from the first surface toward the second surface. On the other hand, the charged particle detector includes a conversion dynode that emits electrons to the electron multiplier in response to an input of charged particles in order to supply the electrons to the electron multiplier having the above-described structure. In particular, in the charged particle detector, the stem is arranged in a vacuum container, and the entire coaxial cable is arranged in a space (first-surface side space) between the anode and the stem.

(2) As one aspect of the present embodiment, in order to fix the exposed portion of the inner conductor constituting a part of the one end portion of the coaxial cable to the anode, the end portion of the outer conductor together with the exposed portion of the inner conductor is preferably positioned in a space (in the dynode unit) interposed between the pair of insulating support members. In this case, it is possible to firmly fix the anode and the inner conductor of the coaxial cable without interposing another wiring element. As one aspect of the present embodiment, when the stem side is viewed from the dynode unit side along the direction from the first surface toward the second surface, the dynode unit is preferably arranged such that a portion of the anode interposed between the pair of insulating support members (a portion of the coaxial cable to which the exposed portion of the inner conductor is fixed) overlaps a portion of the first surface (stem) where the coaxial cable is arranged. With this configuration, the inner conductor of the coaxial cable can reach the anode at the shortest distance.

(3) As one aspect of the present embodiment, the conductive member including one or more conductive elements preferably has a cross-sectional area larger than the cross-sectional area of each of the plurality of lead pins. In addition, since a part (first portion) of the conductive member is fixed to the final-stage dynode (the conductive member is set at the same potential as the final-stage dynode), the occurrence of ringing in the output signal can be effectively suppressed.

(4) As one aspect of the present embodiment, the capacitor includes one external electrode fixed to a part (second portion) of the conductive member, and the other external electrode electrically connected to the outer conductor (portion positioned between the stem and the dynode unit) of the coaxial cable. That is, by bringing the capacitor closer to the conductive member set to the same potential as the final-stage dynode, the occurrence of ringing in the output signal can be more effectively suppressed.

(5) As one aspect of the present embodiment, the conductive member preferably includes a shield electrode attached to a pair of insulating support members. In addition, in order to bring one end portion of the coaxial cable closer to the anode, the shield electrode preferably has an opening for allowing the end portion of the outer conductor to penetrate from the stem side toward the anode together with the exposed portion of the inner conductor. Usually, the shield electrode is provided to restrict movement of light and ions generated at the time of electron collision to the dynode to the outside of the dynode unit, but in the present embodiment, the shield electrode is used as a conductive member set to the same potential as a potential of the final-stage dynode. In this case, as one aspect of the present embodiment, the capacitor is positioned in a space between the shield electrode and the stem. Furthermore, as one aspect of the present embodiment, in a configuration in which the electron multiplier is housed in a sealed container or a configuration in which a stem of the electron multiplier itself functions as a part of the sealed container (in this case, the internal space of the sealed container corresponds to the first-surface side space), it is preferable that the capacitor housed in the sealed container includes a ceramic capacitor in order to be able to operate in a vacuum state (depressurized state) and to facilitate bonding with the conductive member.

As described above, each of the aspects listed in the section [Details of Embodiment of Present Disclosure] is applicable to each of all the remaining aspects or all combinations of these remaining aspects.

Details of Embodiment of Present Disclosure

Hereinafter, specific structures of an electron multiplier, a photoelectron multiplier, and a charged particle detector according to the present embodiment will be described in detail with reference to the accompanying drawings. The present invention is not limited to these examples, but is defined by the scope of the claims. The present invention is intended to include meanings equivalent to the claims and all modifications within the claims. In the description of the drawings, the same components are denoted by the same reference signs, and the redundant description will be omitted.

In the following disclosure, an example of the photoelectron multiplier including the electron multiplier according to the present embodiment as a main part will be described. Similarly to the photoelectron multiplier, the charged particle detector also includes the electron multiplier according to the present embodiment as a main part. The charged particle detector has a structure equivalent to a structure of the photoelectron multiplier except that the charged particle detector does not include a vacuum container (sealed container), a structure of a stem is not limited to a structure penetrating through a lead pin, the charged particle detector has a conversion unit that converts charged particles of a conversion dynode and a Faraday cup into electrons instead of a cathode, and the entire coaxial cable is arranged in a space between a dynode unit and the stem, and the following description regarding an example of the photoelectron multiplier substantially applies to the charged particle detector.

Figure 2:
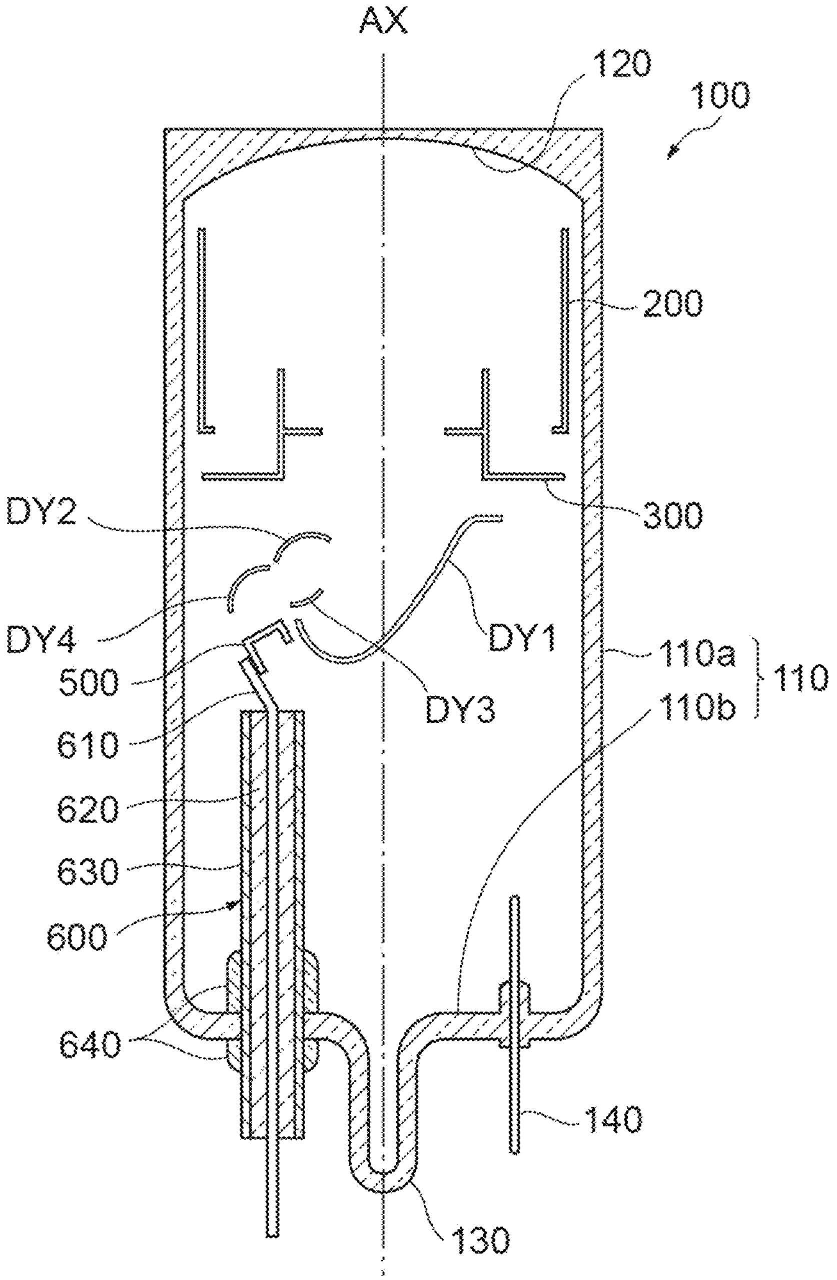
FIG. 2 is a diagram illustrating a cross-sectional structure taken along line I-I illustrated in FIG. 1 in the example of the photoelectron multiplier according to the present embodiment.

FIG. 1 is a partially cutaway view schematically illustrating an example of an internal structure of the photoelectron multiplier (an example of the photoelectron multiplier according to the present embodiment) as an example of a detector including the electron multiplier according to the present embodiment as a main part. FIG. 2 is a diagram illustrating a cross-sectional structure taken along a line I-I illustrated in FIG. 1 of the example of the photoelectron multiplier according to the present embodiment.

As illustrated in FIG. 1, a photoelectron multiplier 100 includes a sealed container 110 in which a pipe 130 (sealed after being evacuated) for evacuating an inside is provided at a bottom, and includes a cathode 120 and an electron multiplier unit provided in the sealed container 110.

The sealed container 110 includes a cylindrical main body 110*a* having a face plate in which the cathode 120 is formed, and a stem 110*b* that holds a coaxial cable 600 and a plurality of lead pins 140 in a state where the coaxial cable and the plurality of lead pins penetrate. The main body 110*a* has an opening end extending along a central axis (pipe axis) AX and defining an opening intersecting the central axis AX. The stem 110*b* is in close contact with the opening end of the main body 110*a* in a state of closing the opening end. An internal space of the sealed container 110 is maintained in a predetermined depressurized state by sealing the pipe 130 after remaining gas is exhausted via the pipe 130. In the sealed container 110, the electron multiplier unit is held at a predetermined position in the sealed container 110 by the lead pin 140 extending from the stem 110*b* into the sealed container 110.

The electron multiplier unit includes a focusing electrode 200, an acceleration electrode 300, and a dynode unit 400 in which an anode 500 is arranged. The focusing electrode 200 is an electrode for correcting a trajectory of photoelectrons such that the photoelectrons emitted from the cathode 120 are focused on the dynode unit 400, is arranged between the cathode 120 and the dynode unit 400, and has a through-hole through which the photoelectrons penetrate from the cathode 120. The acceleration electrode 300 is an electrode that accelerates the photoelectrons emitted from the cathode 120 to the dynode unit 400, is arranged between the focusing electrode 200 and the dynode unit 400, and has a through-hole that allows the photoelectrons having passed through the through-hole of the focusing electrode 200 to further pass toward the dynode unit 400. The acceleration electrode 300 reduces variation in transit time of the photoelectrons from the cathode 120 to the dynode unit 400 due to a photoelectron emission site of the cathode 120. The dynode unit 400 includes multiple-stage dynodes DY1 to DY4 for sequentially cascade multiplying secondary electrons emitted in response to the photoelectrons having reached from the cathode 120 via the focusing electrode 200 and the acceleration electrode 300, the anode 500 that captures, as an electric signal, the secondary electrons cascade-multiplied by the multiple-stage dynodes DY1 to DY4, and a pair of insulating support members 410*a* and 410*b* (see FIG. 4) that integrally grip the multiple-stage dynodes DY1 to DY4 and the anode 500.

Similarly to the plurality of lead pins 140, the coaxial cable 600 includes an inner conductor 610 extending along the central axis AX, a glass material 620 as an insulating material provided on an outer peripheral surface of the inner conductor 610, and an outer conductor 630 provided on an outer peripheral surface of the glass material 620, and a distal end (exposed portion) of the inner conductor 610 to be fixed to the anode 500 is in a state of being exposed from each end portion of the glass material 620 and the outer conductor 630. The exposed portion of the inner conductor 610, the end portion of the glass material 620, and the end portion of the outer conductor 630 constitute one end portion of the coaxial cable 600. Together with the inner conductor 610 (in particular, the exposed portion), end portions of the glass material 620 and the outer conductor 630 are also introduced into the sealed container 110. The coaxial cable 600 is fixed to the stem 110*b* in which the depressurized state is maintained by a hermetic seal 640. One end portion of the coaxial cable 600 constituted by the exposed portion of the inner conductor 610, the end portion of the glass material 620, and the end portion of the outer conductor 630 is positioned in a space interposed between the pair of insulating support members 410*a* and 410*b*, and the exposed portion of the inner conductor 610 is directly or indirectly fixed to a portion of the anode 500 interposed between the pair of insulating support members 410*a* and 410*b*. The fixing of the inner conductor 610 (in particular, the exposed portion) to the anode 500 is performed by resistance welding.

Figure 4:
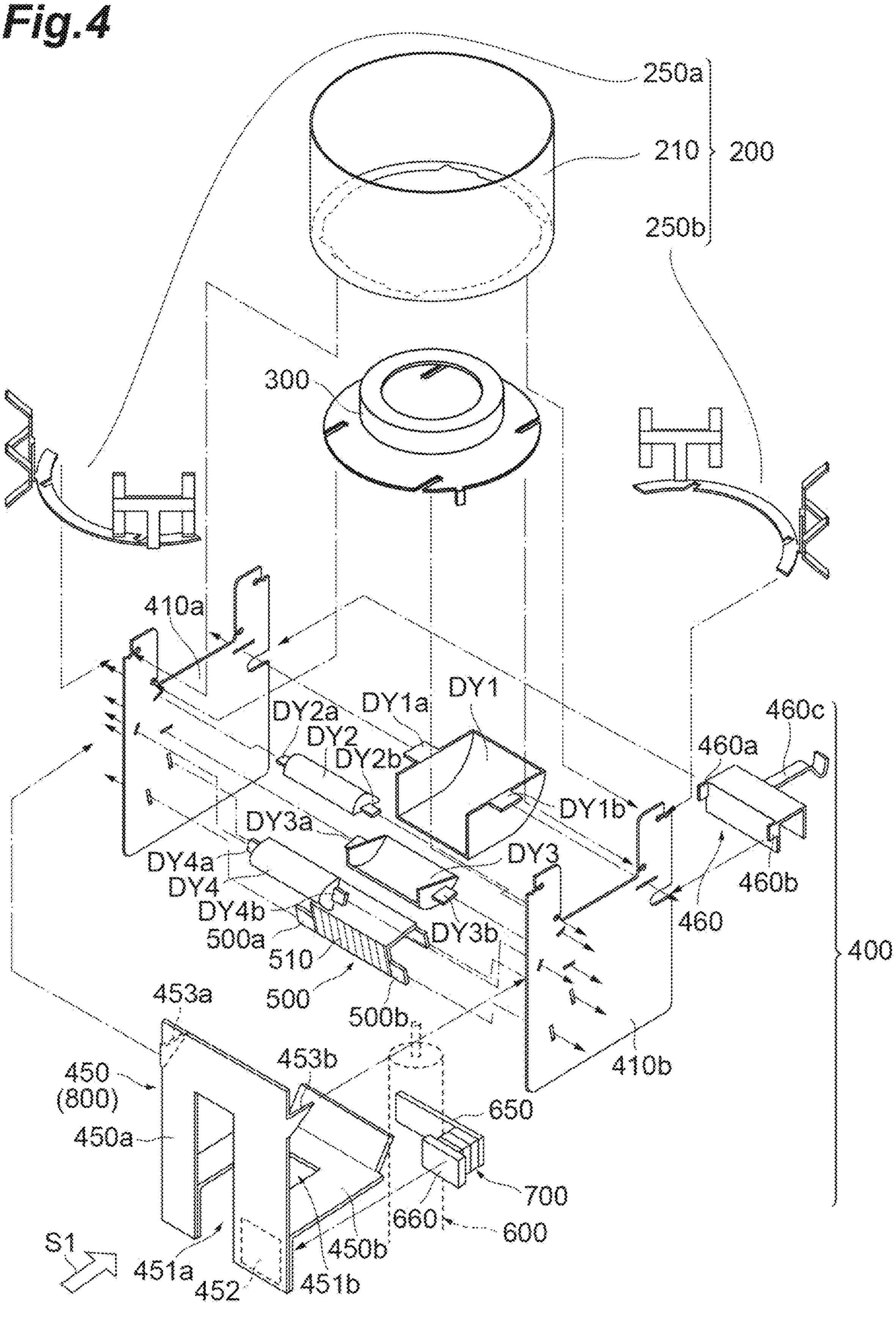
FIG. 4 is an assembly process diagram of a main part in the example of the photoelectron multiplier according to the present embodiment.
Figure 6:
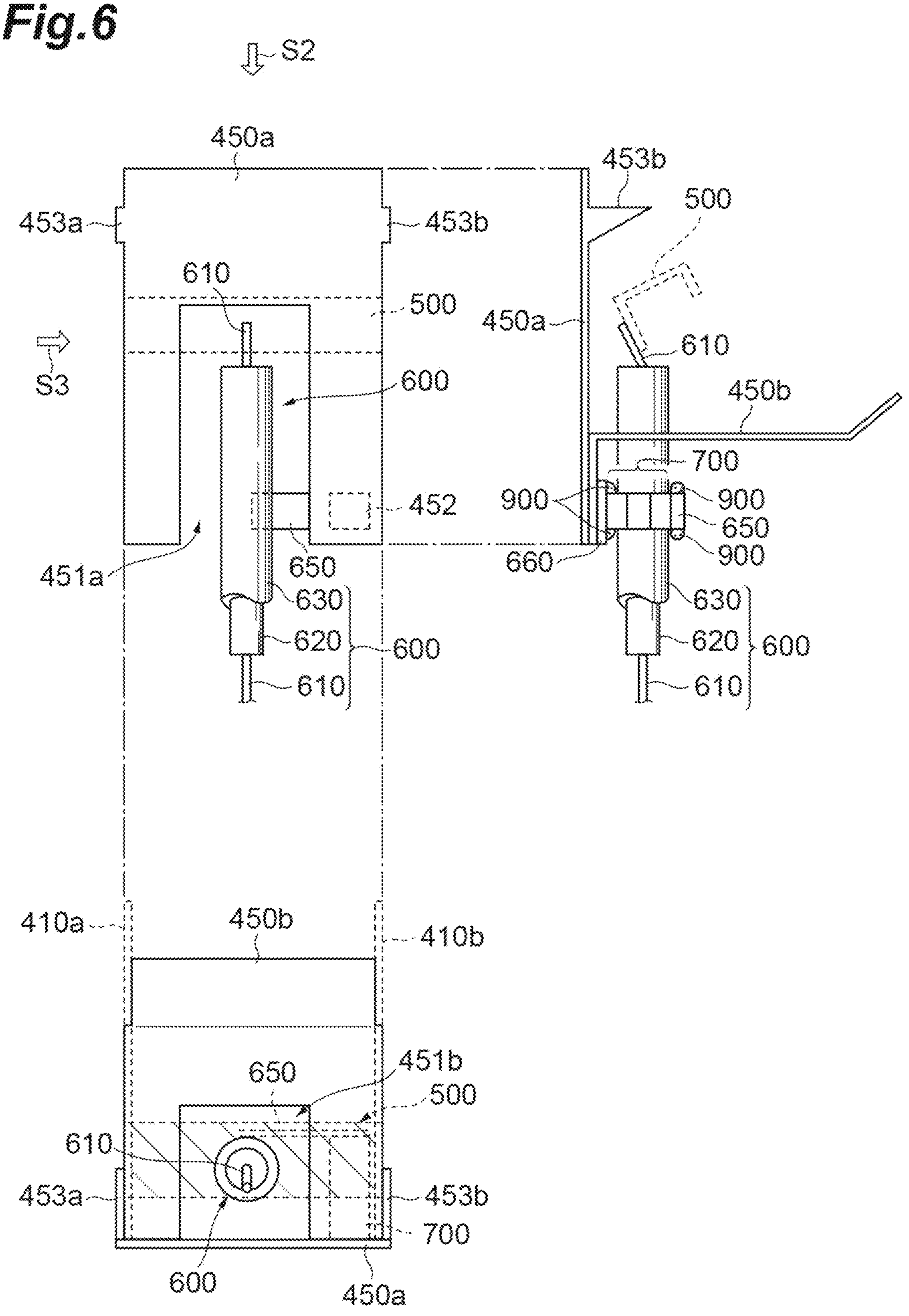
FIG. 6 is a diagram schematically illustrating a positional relationship between a shield electrode and the coaxial cable in the sealed container.

A conductive member 800 and a capacitor (decoupling capacitor) 700 are housed in the sealed container 110. In the example of FIG. 1, the conductive member 800 includes a shield electrode 450 attached to the pair of insulating support members 410*a* and 410*b*, and a part of the shield electrode 450 is resistance-welded to the fourth-stage dynode (final-stage dynode) DY4. Note that the cross-sectional area (area of a region interposed between a surface facing the multiple-stage dynodes DY1 to DY4 and a surface facing an inner wall of the sealed container 110) of the shield electrode 450 is larger than the cross-sectional area of the lead pin 140. As shown in FIGS. 4 and 6, one external electrode of the capacitor 700 is bonded and fixed to a metal plate 660 via a silver paste 900, and the other external electrode of the capacitor 700 is bonded and fixed to one end of a metal plate 650 via the silver paste 900. Each of the metal plates 650 and 660 has a cross-sectional area larger than a cross-sectional area of the lead pin 140. The metal plate 650 and the metal plate 660 fixed to both ends of the capacitor 700 are resistance-welded to the shield electrode 450 and the outer conductor 630 of the coaxial cable 600, respectively. Similarly to the metal plate 650, the metal plate 650 may have a ribbon shape in order to facilitate resistance welding work between the metal plate 660 and the shield electrode 450.

In the electron multiplier unit stored in the sealed container 110, as illustrated in FIG. 2, the dynode unit 400 is integrally held together with the focusing electrode 200 and the acceleration electrode 300 by the pair of insulating support members 410*a* and 410*b* (see FIG. 4). In particular, a positional relationship among the focusing electrode 200, the acceleration electrode 300, the first-stage dynode DY1 to the fourth-stage dynode (final-stage dynode) DY4, and the anode 500 is fixed by the pair of insulating support members 410*a* and 410*b*.

As described above, the photoelectron multiplier 100 has a structure in which at least the acceleration electrode 300 and the dynode unit 400 are integrally held in a state in which at least the first-stage dynode DY1 and the second-stage dynode DY2 included in the dynode unit 400 directly face the acceleration electrode 300 without a conductive member interposed therebetween. In the photoelectron multiplier 100 according to the present embodiment, since the photoelectrons traveling from the cathode 120 toward the first-stage dynode DY1 are accelerated by the acceleration electrode 300, the variation in the photoelectron transit time is drastically reduced while the photoelectrons reach the first-stage dynode DY1 from the cathode 120.

In FIG. 2, an internal structure of the coaxial cable 600 and a positional relationship between the coaxial cable 600 and the anode 500 are clearly shown. That is, in the coaxial cable 600 fixed to the stem 110*b* by the hermetic seal 640, an end portion thereof extends from the stem 110*b* toward the anode 500 (the end portion extends to be positioned in the dynode unit 400 defined by the space interposed between the pair of insulating support members 410*a* and 410*b*). In one end portion of the coaxial cable 600, a part of the inner conductor 610 is exposed from the glass material 620 and the outer conductor 630, and an exposed portion of the inner conductor 610 is fixed to the anode 500 by resistance welding. Note that, in order to fix the exposed portion of the inner conductor 610 of the coaxial cable 600 to the anode 500 at the shortest distance, as will be described later, when the stem 110*b* side is viewed from the cathode 120 side along the central axis AX of the sealed container 110, a portion of the anode 500 to which the exposed portion of the inner conductor 610 is fixed overlaps a portion of the stem 110*b* through which the coaxial cable 600 penetrates. In this case, as a matter of course, the portion of the anode 500 to which the inner conductor 610 is fixed is a portion interposed between the pair of insulating support members 410*a* and 410*b*. Accordingly, it is possible to directly connect the anode 500 and the exposed portion of the inner conductor 610 of the coaxial cable 600 without interposing another wiring element, for example, a wiring having a cross-sectional area similar to a cross-sectional area of the lead pin 140 having a cross-sectional area smaller than a cross-sectional area of the inner conductor 610.

Figure 3A:
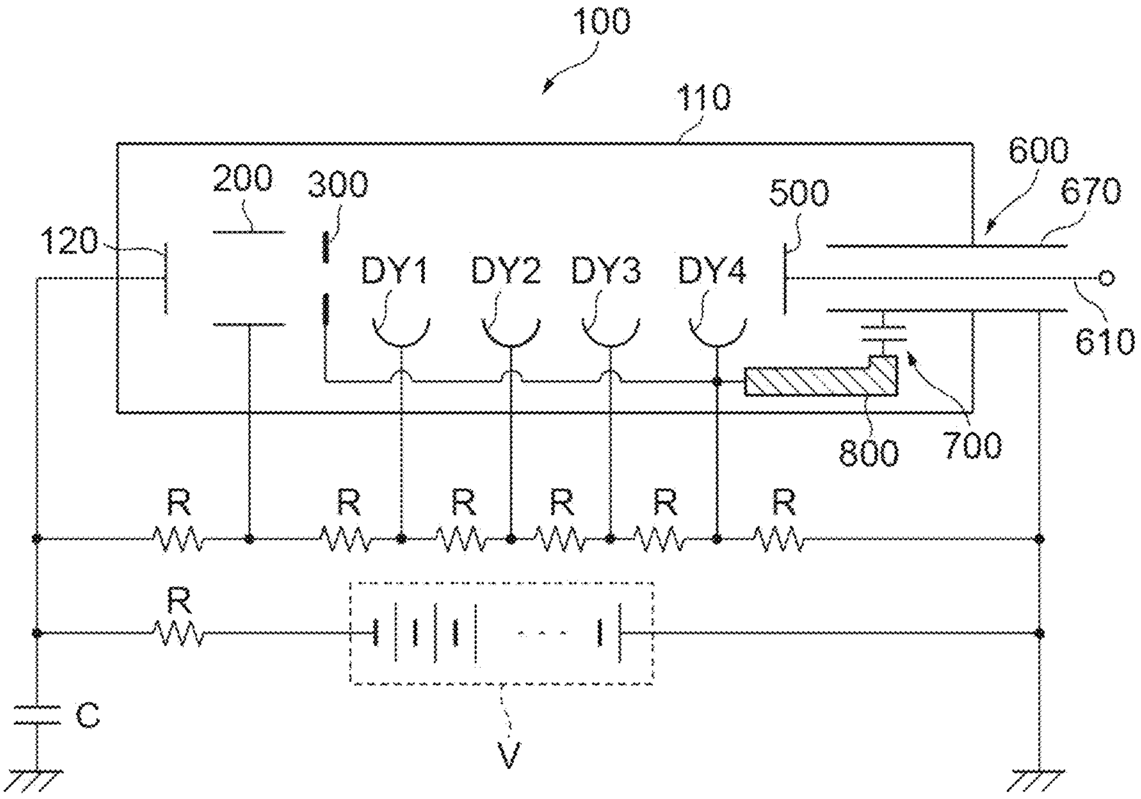
FIGS. 3A and 3B are diagrams illustrating a schematic configuration and response characteristics of a power source circuit for operating an example of the photoelectron multiplier according to the present embodiment.
Figure 3B:
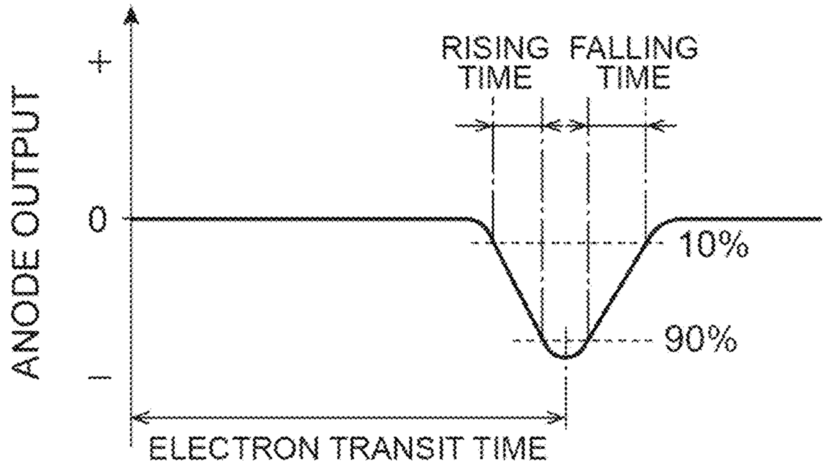

FIG. 3A is a diagram illustrating a schematic configuration of a power source circuit for operating an example of the photoelectron multiplier according to the present embodiment having the above-described structure, and FIG. 3B is a diagram for describing response characteristics of an example of the photoelectron multiplier according to the present embodiment.

As schematically illustrated in FIG. 3A, the cathode 120, the focusing electrode 200, the acceleration electrode 300, the multiple-stage dynodes DY1 to DY4, and the anode 500 provided on an inner wall surface of the face plate from the face plate of the main body 110*a* toward the stem 110*b* are arranged in the sealed container 110 of the photoelectron multiplier 100. The arrangement of the first-stage dynode DY1, the second-stage dynode DY2, the third-stage dynode DY3, and the fourth-stage dynode (final-stage dynode) DY4 is illustrated in the order of passage of the photoelectrons or the secondary electrons. Each potential of the cathode 120, the focusing electrode 200, each of the multiple-stage dynodes DY1 to DY4, and the anode 500 is set by a divider circuit that divides a voltage to be applied by a power source V by a series circuit of a plurality of Rs and a capacitor C as illustrated in FIG. 3A. In the example of FIG. 3A, the acceleration electrode 300 is set to the potential of the fourth-stage dynode DY4.

One end portion of the coaxial cable 600 is introduced into a space on the stem 110*b* side in the sealed container 110, and the exposed portion of the inner conductor 610 is directly fixed to the anode 500. The capacitor (ceramic capacitor) 700 is also housed in the sealed container 110, and one of the external electrodes is resistance-welded to the conductive member 800 set to the same potential as the potential of the fourth-stage dynode DY4 via a predetermined conductive member. The other external electrode of the capacitor 700 is electrically connected to the outer conductor 630 positioned in the sealed container 110 via a predetermined conductive member.

As the response characteristics of the photoelectron multiplier 100 having the above-described structure, an anode output (electronic signal) has a shape as schematically illustrated in FIG. 3B. Note that a waveform illustrated in FIG. 3B is an anode-side output waveform assuming a case where light from a delta-function light source reaches the cathode 120. Normally, when the photoelectrons are emitted from the cathode 120 by receiving the light from the light source, the secondary electrons cascade-multiplied via the multiple-stage dynodes DY1 to DY4 reach the anode 500, and are output to the outside of the sealed container 110 as an electric signal. A time from the photoelectron output from the cathode 120 to a peak of the anode output is an "electron transit time". A period from a point in time at which a signal amount reaches 10% of a signal peak to a point in time at which the signal amount reaches 90% of the signal peak is referred to as a "rising time", and conversely, a period from a point in time at which the signal amount reaches 90% of the signal peak to a point in time at which the signal amount reaches 10% of the signal peak is referred to as a "falling time".

Next, FIG. 4 is an assembly process diagram of a main part in the example of the photoelectron multiplier according to the present embodiment. As in the example illustrated in FIG. 4, the electron multiplier unit is constituted by the dynode unit 400 including the focusing electrode 200, the acceleration electrode 300, and the anode 500. A through-hole for allowing the photoelectrons from the cathode 120 to pass toward the first-stage dynode DY1 is provided in each of the focusing electrode 200 and the acceleration electrode 300.

In the example illustrated in FIG. 4, the focusing electrode 200 includes a body portion 210 (substantially a focusing electrode main body, and this body portion 210 is referred to herein merely as a "focusing electrode") and reinforcing members 250*a* and 250*b* for suppressing rotation of the body portion 210. The body portion 210 has a cylindrical shape, and includes a flange portion extending inward from one opening end of the body portion 210 and defining a through-hole. The flange portion is gripped by slit grooves provided in protrusion portions of the first insulating support member 410*a* and the second insulating support member 410*b* constituting the pair of insulating support members described above.

The acceleration electrode 300 has an opening for allowing the photoelectrons from the cathode 120 to pass toward the first-stage dynode DY1, and has a flange portion for fixing the acceleration electrode 300 itself to the first and second insulating support members 410*a* and 410*b*. The protrusion portions provided on the first and second insulating support members 410*a* and 410*b* are gripped by the slit grooves provided in the flange portions, and thus, the acceleration electrode 300 is fixed to the first and second insulating support members 410*a* and 410*b*.

The dynode unit 400 includes the first-stage dynode DY1 to the fourth-stage dynode (final-stage dynode) DY4 and the anode 500 which are gripped by the first and second insulating support members 410*a* and 410*b*, respectively. A reflective secondary electron emitting surface that receives the photoelectrons or the secondary electrons and newly emits the secondary electrons in an incident direction of the electrons are formed in each of the first-stage dynode DY1 to the fourth-stage dynode (final-stage dynode) DY4. Fixing pieces DY1*a* and DY1*b* are provided at both ends of the first-stage dynode DY1 so as to be gripped by the first and second insulating support members 410*a* and 410*b*. That is, the first-stage dynode DY1 is gripped by the first and second insulating support members 410*a* and 410*b* in a state where the fixing piece DY1*a* penetrates a slit hole provided in the first insulating support member 410*a* and the fixing piece DY1*b* penetrates a slit hole provided in the second insulating support member 410*b*. Similarly, the second-stage dynode DY2 has fixing pieces DY2*a* and DY2*b* at both ends thereof, the third-stage dynode DY3 has fixing pieces DY3*a* and DY3*b* at both ends thereof, and the fourth-stage dynode DY4 has fixing pieces DY4*a* and DY4*b* at both ends thereof.

The anode 500 has an electron capturing surface at a position where the secondary electrons emitted from the fourth-stage dynode DY4 reach, and has a fixing surface 510 (see FIG. 5A) for fixing one end portion of the coaxial cable 600 inserted into the sealed container 110, particularly, a distal end portion of the inner conductor 610. At both ends of the anode 500, a pair of fixing pieces 500*a* and a pair of fixing pieces 500*b* are provided so as to be gripped by the first and second insulating support members 410*a* and 410*b*.

The shield electrode 450 that covers two gaps between a side where the anode 500 is exposed and the stem 110*b* side is attached to the first and second insulating support members 410*a* and 410*b*. A cathode electrode 460 is attached to the first and second insulating support members 410*a* and 410*b* on a side opposite to the shield electrode 450. The cathode electrode 460 has fixing pieces 460*a* and 460*b* to be fitted into recess portions provided in the first and second insulating support members 410*a* and 410*b*, respectively. A metal piece 460*c* in contact with a metal thin film extending from the cathode 120 along an inner wall of the main body 110*a* of the sealed container 110 is resistance-welded to a back surface of the cathode electrode 460.

The shield electrode 450 corresponds to the conductive member 800 illustrated in FIG. 3A, and includes a first conductive plate 450*a* and a second conductive plate 450*b* each having a cross-sectional area larger than the cross-sectional area of the lead pin 140 (the first and second conductive plates 450*a* and 450*b* are resistance-welded). Here, a notch portion 451*a* is provided in the first conductive plate 450*a*. Similarly, a notch portion 451*b* is also provided in the second conductive plate 450*b*. The second conductive plate 450*b* is resistance-welded to the first conductive plate 450*a*, and thus, a through-hole through which one end portion of the coaxial cable 600 penetrates is formed. Accordingly, one end portion of the coaxial cable 600 can directly reach a space interposed between the first and second insulating support members 410*a* and 410*b* via the through-hole provided in the shield electrode 450.

Fixing pieces 453*a* and 453*b* that are resistance-welded to the fixing pieces DY4*a* and DY4*b* of the fourth-stage dynode DY4 are provided in the first conductive plate 450*a*. With this configuration, the shield electrode 450 is set to the same potential as the potential of the fourth-stage dynode DY4. An end portion of the first conductive plate 450*a* where the notch portion 451*a* is provided extends toward the stem 110*b* side from a position where the second conductive plate 450*b* is fixed. One external electrode of the capacitor (ceramic capacitor) 700 is electrically connected to the portion extending to the stem 110*b* side. Specifically, the metal plate 660 is bonded and fixed to one external electrode of the capacitor 700 via the silver paste 900, and a region 452 for fixing by resistance welding is secured in the portion extending toward the stem 110*b* side (see FIGS. 4 and 6).

The other external electrode of the capacitor 700 is electrically connected to the outer conductor 630 of the coaxial cable 600 drawn into the sealed container 110. This electrical connection is realized by the metal plate 650. That is, one end portion of the metal plate 650 is resistance-welded to the outer conductor 630 of the coaxial cable 600. On the other hand, the other external electrode of the capacitor 700 is bonded and fixed to the other end portion of the metal plate 650 via the silver paste 900 (see FIGS. 4 and 6). Through the above assembly process, the electron multiplier unit of the photoelectron multiplier 100 according to the present embodiment is obtained.

Figure 5A:
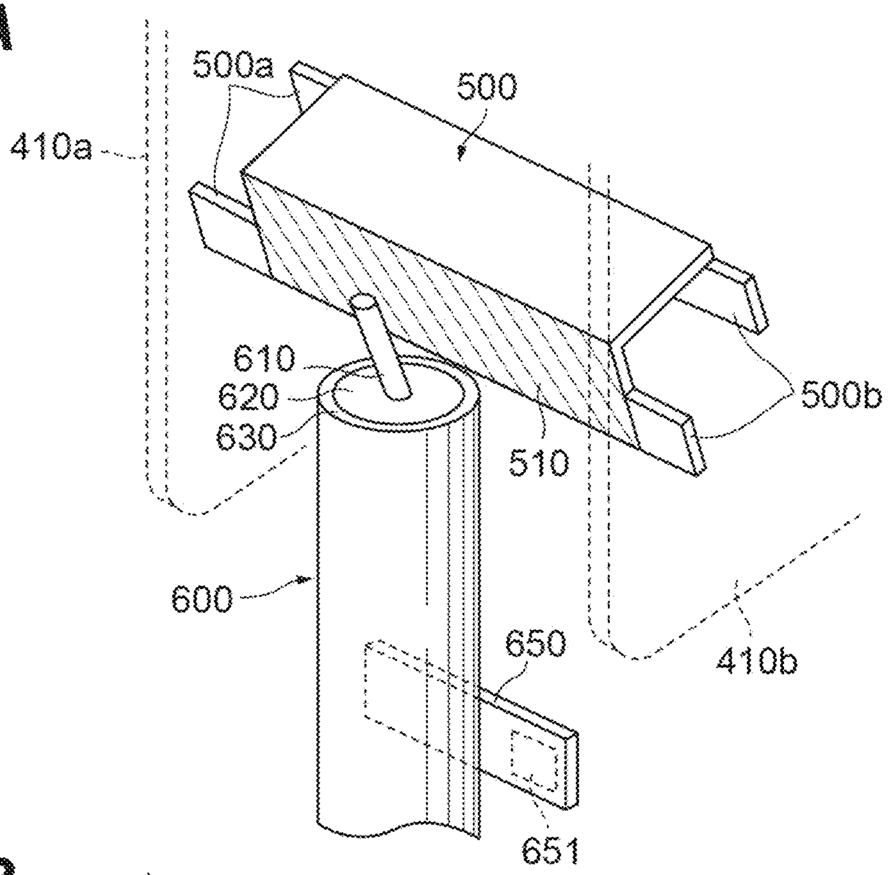
FIGS. 5A and 5B are diagrams schematically illustrating a connection state of an inner conductor and an anode of a coaxial cable in a sealed container.
Figure 5B:
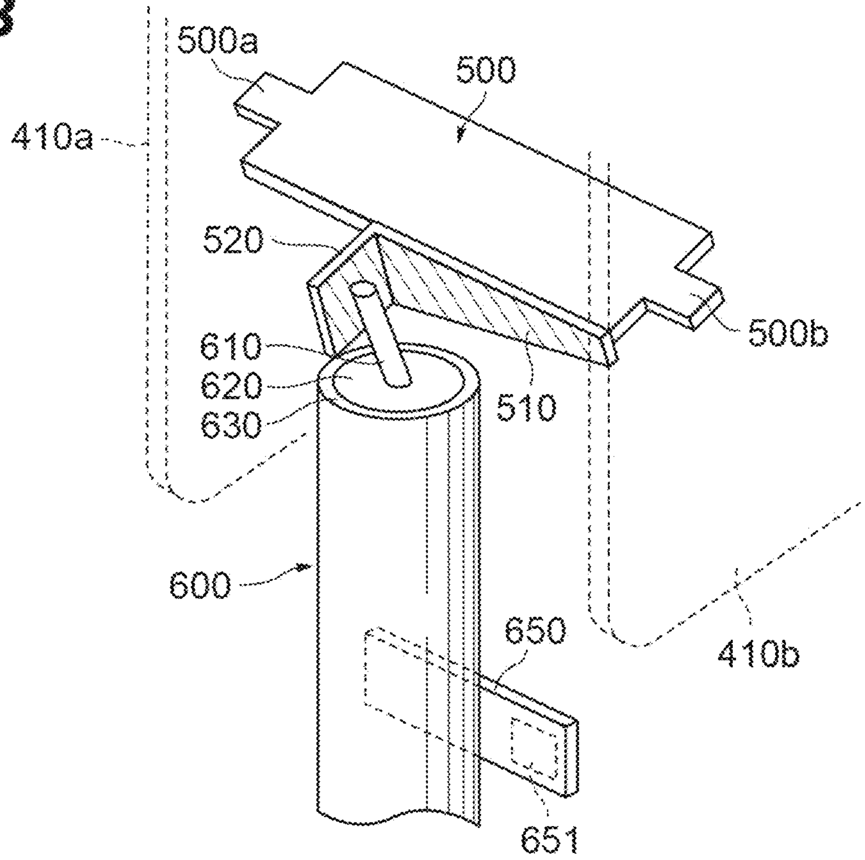

FIGS. 5A and 5B are diagrams schematically illustrating a configuration when the electron multiplier unit having the above-described configuration is observed along an arrow (observation direction) S1 illustrated in FIG. 4, particularly, a connection state of the exposed portion of the inner conductor 610 in the coaxial cable 600 and the anode 500 in the sealed container 110. Note that, in FIGS. 5A and 5B, the disclosure of a shielding object such as the shield electrode 450 is omitted such that the positional relationship between the coaxial cable 600 and the anode 500 becomes clear.

As shown in FIG. 5A, the anode 500 is gripped by the first and second insulating support members 410*a* and 410*b* by the pair of fixing pieces 500*a* being inserted into the corresponding slit hole of the first insulating support member 410*a* and the pair of fixing pieces 500*b* being inserted into the corresponding slit hole of the second insulating support member 410*b*. In such a gripped state, the electron capturing surface of the anode 500 is directed toward the fourth-stage dynode DY4 side. The fixing surface 510 on which the exposed portion of the inner conductor 610 in the coaxial cable 600 is resistance-welded is in a positional relationship of intersecting the electron capturing surface. The fixing surface 510 is inclined with respect to the electron capturing surface in this manner, and thus, it is possible to draw the coaxial cable 600 into the sealed container 110 without bending one end portion thereof at the time of resistance welding of the exposed portion of the inner conductor 610 and the fixing surface 510. On the other hand, in the example illustrated in FIG. 5B, the exposed portion of the inner conductor 610 is resistance-welded to an electrode member 520 having the fixing surface 510. The electrode member 520 is a metal member constituting a part of the anode 500, and the exposed portion of the inner conductor 610 is indirectly fixed to the anode 500 by resistance-welding the electrode member 520 to a side surface of the anode 500.

In both the examples of FIGS. 5A and 5B, at one end portion of the coaxial cable 600 drawn into the sealed container 110, one end portion of the metal plate 650 is resistance-welded to an outer peripheral surface of the outer conductor 630. A region 651 where the other external electrode of the capacitor 700 is bonded and fixed via the silver paste 900 is secured at the other end portion of the metal plate 650 (see FIG. 6).

As described above, the response characteristics are improved as compared with the related art by realizing the structure in which one end portion (including the exposed portion of the inner conductor 610, the end portion of the glass material 620, and the end portion of the outer conductor 630) of the coaxial cable 600 is drawn into the sealed container 110 and the exposed portion of the inner conductor 610 in the coaxial cable 600 can be directly fixed to the fixing surface 510 of the anode 500. The end portion of the outer conductor 630 of the coaxial cable 600 is also drawn into the sealed container 110, and thus, the configuration in which the capacitor (ceramic capacitor) 700 for suppressing reflection of a high-frequency component can be arranged in the sealed container 110. In this case, the occurrence of ringing in a signal waveform emitted from the anode 500 can be effectively suppressed.

In addition, in order to strengthen the connection state between the inner conductor 610 of the coaxial cable 600 and the anode 500, it is preferable that a length (length of the exposed portion) of the inner conductor 610 exposed from the glass material 620 and the outer conductor 630 of the coaxial cable 600 is short. Thus, it is preferable that one end portion of the coaxial cable 600 is drawn into a position closer to the anode 500, that is, in a space interposed between the first and second insulating support members 410*a* and 410*b*, including at least the end portion of the outer conductor 630. In such a configuration, when the stem 110*b* side is viewed from the cathode 120 side along the central axis AX of the sealed container 110, the dynode unit 400 is arranged such that the anode 500 having the fixing surface 510 overlaps the portion of the stem 110*b* through which the coaxial cable 600 penetrates.

Next, FIG. 6 is a diagram schematically illustrating a positional relationship between the shield electrode 450 and the coaxial cable 600 in the sealed container 110. Note that, in FIG. 6, a plan view illustrated on an upper left side is a plan view when the electron multiplier unit (in particular, the first conductive plate 450*a* of the shield electrode 450) is viewed along an arrow S1 illustrated in FIG. 4. A plan view illustrated on a lower left side of FIG. 6 is a plan view when the shield electrode 450 (first conductive plate 450*a* and second conductive plate 450*b*) is viewed along an arrow S2 illustrated in FIG. 6. The plan view illustrated on an upper right side in FIG. 6 is a plan view when the shield electrode 450 (in particular, the second conductive plate 450*b*) is viewed along an arrow S3 illustrated in FIG. 6, and in particular, a fixing state of the shield electrode 450 and the capacitor 700 and a fixing state of the capacitor 700 and the metal plate 650 are illustrated in detail.

The above-described various structural features of the photoelectron multiplier 100 can be confirmed from the plan view seen from each direction illustrated in FIG. 6. That is, (a) the exposed portion of the inner conductor 610 of the coaxial cable 600 positioned in the internal space of the sealed container 110 is fixed to the fixing surface 510 of the anode 500 interposed between the first and second insulating support members 410*a* and 410*b*. (b) The outer conductor 630 of the coaxial cable 600 is also drawn into the sealed container 110 in order to allow the capacitor 700 to be housed in the sealed container 110. (c) In particular, the end portion of the outer conductor 630 is positioned in the space interposed between the first and second insulating support members 410*a* and 410*b* in order to shorten the exposed portion of the inner conductor 610. (d) When the stem 110*b* side is viewed from the cathode 120 side along the central axis AX of the sealed container 110, the anode 500 overlaps the portion of the stem 110*b* through which the coaxial cable 600 penetrates. (e) Each of the first and second conductive plates 450*a* and 450*b* constituting the shield electrode 450 has a cross-sectional area larger than the cross-sectional area of the lead pin 140. (f) The capacitor 700 can be positioned in the space between the shield electrode 450 and the stem 110*b*, and as a result, the capacitor is housed in the sealed container 110. (g) In order to bring one end portion of the coaxial cable 600 closer to the anode 500, the shield electrode 450 has an opening for allowing each end portion of the glass material 620 and the outer conductor 630 to penetrate toward the anode 500 from the stem 110*b* side together with the exposed portion of the inner conductor 610.

Note that an installation position of the capacitor 700 is not limited to the example illustrated in FIG. 6. The metal plate 650 and the metal plate 660 are bonded and fixed to the external electrodes positioned at both ends of the capacitor 700 via the silver paste. Thus, the shapes and the like of the metal plates 650 and 660 are adjusted, and thus, the installation position of the capacitor 700 can be set at a position that does not interfere with welding work, for example, a position closer to the stem 110*b* than the position illustrated on the upper right side of FIG. 6 (configuration in which the capacitor 700 is sufficiently separated from the welded portion). In this case, a space sufficient for the welding work can be secured between the second conductive plate 450*b* and the capacitor 700.

Figure 7:
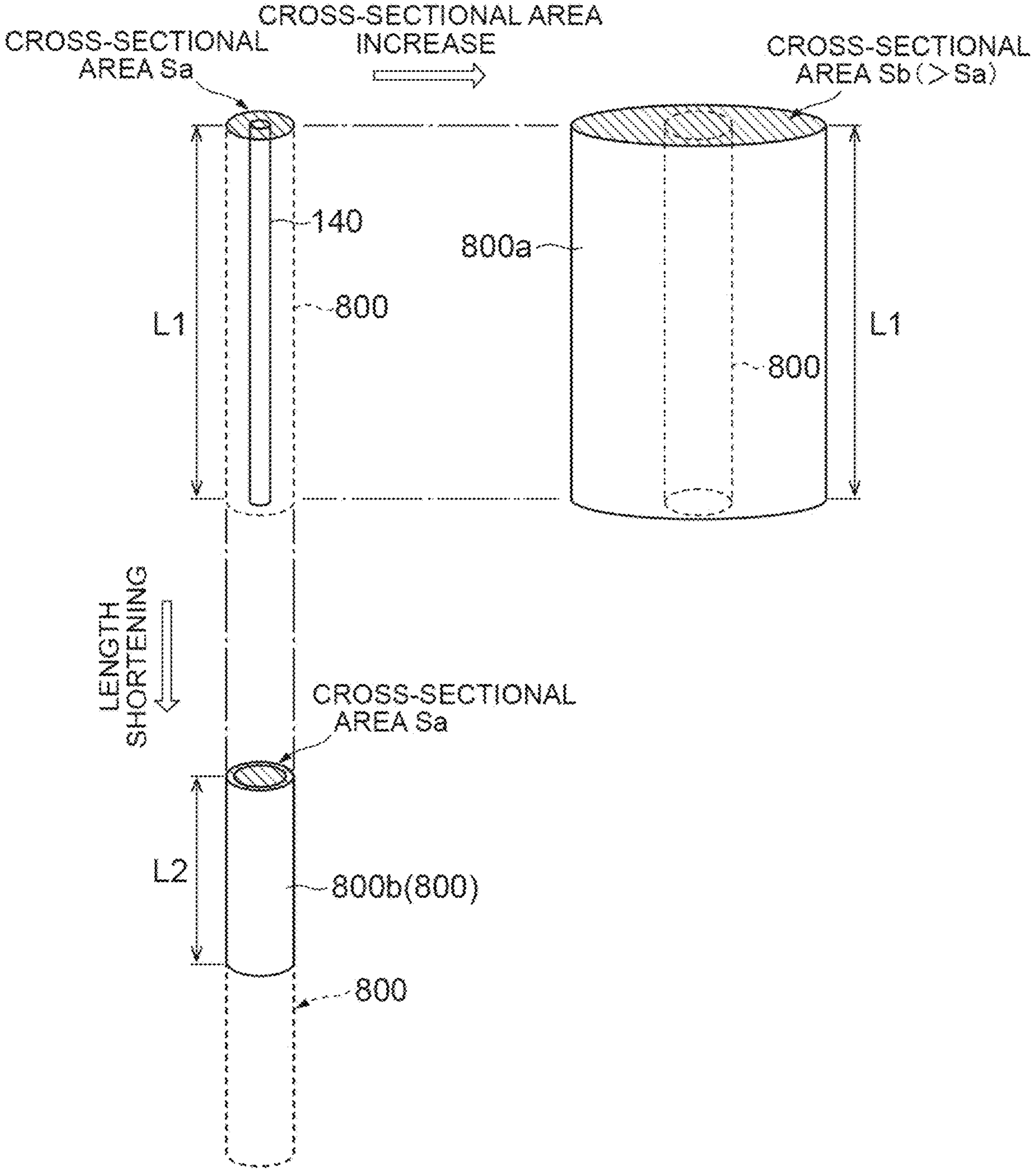
FIG. 7 is a diagram schematically illustrating structural features of a conductive member.

FIG. 7 is a diagram schematically illustrating structural features of the conductive member 800 (including the shield electrode 450) illustrated in FIGS. 3A and 3B. That is, in order to suppress the reflection of the high-frequency component, as illustrated on the upper left side of FIG. 7, it is preferable that a cross-sectional area Sa of the conductive member 800 having a length L1 is larger than the cross-sectional area of the lead pin 140. However, as illustrated on an upper right side of FIG. 7, even though the conductive members have the same length L1, a conductive member 800*a* having a larger cross-sectional area Sb (>Sa) like the above-described shield electrode 450 is more effective for suppressing the reflection of the high-frequency component. As illustrated on a lower left side of FIG. 7, even though the conductive members have the same cross-sectional area Sa, a conductive member 800*b* having a shorter length L2 (<L1) is also effective for suppressing the reflection of the high-frequency component.

Figure 8:
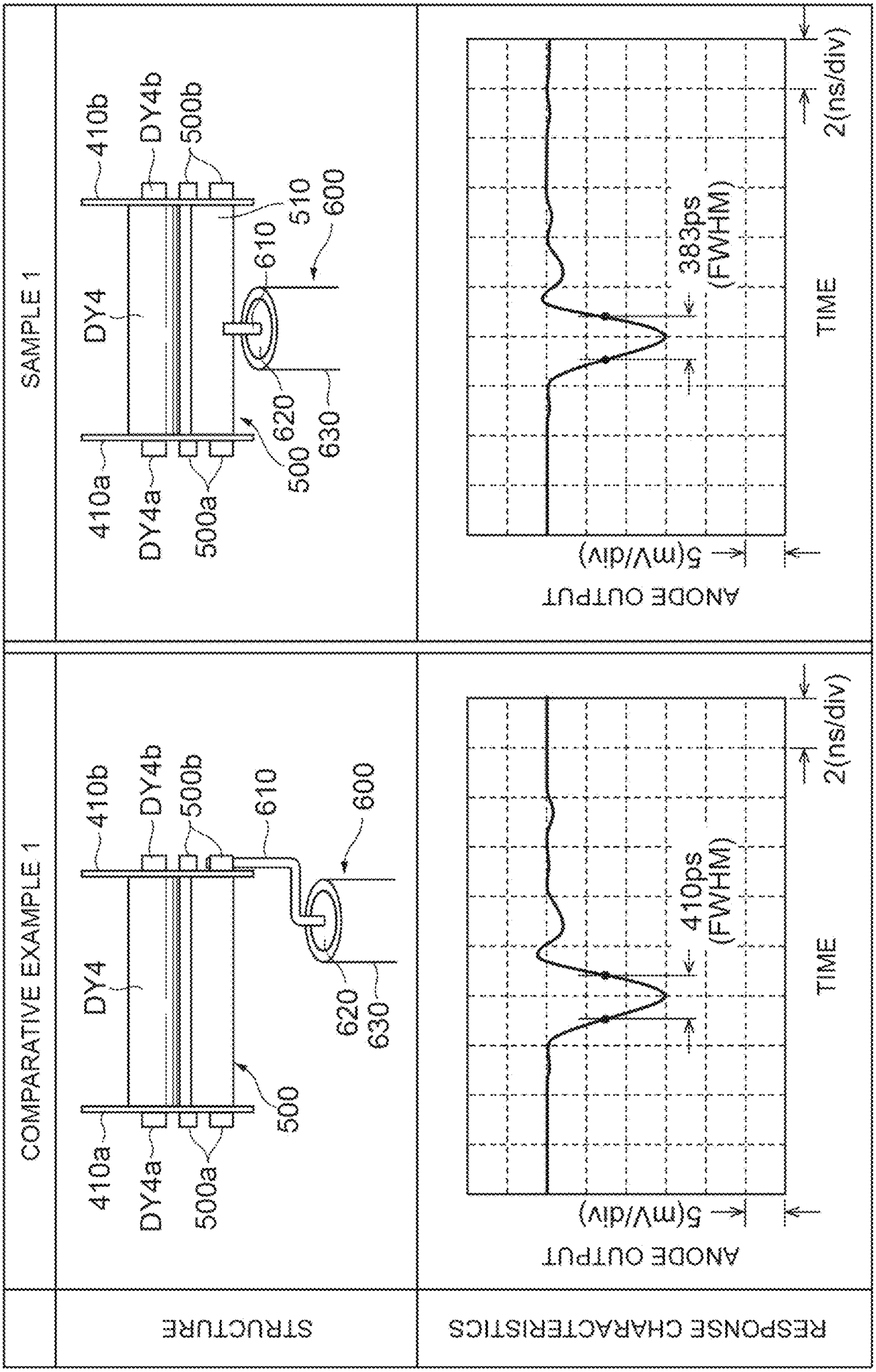
FIG. 8 is a diagram illustrating a difference in response characteristics between Sample 1 partially adopting the structural features of the photoelectron multiplier according to the present embodiment and Comparative Example 1.
Figure 9:
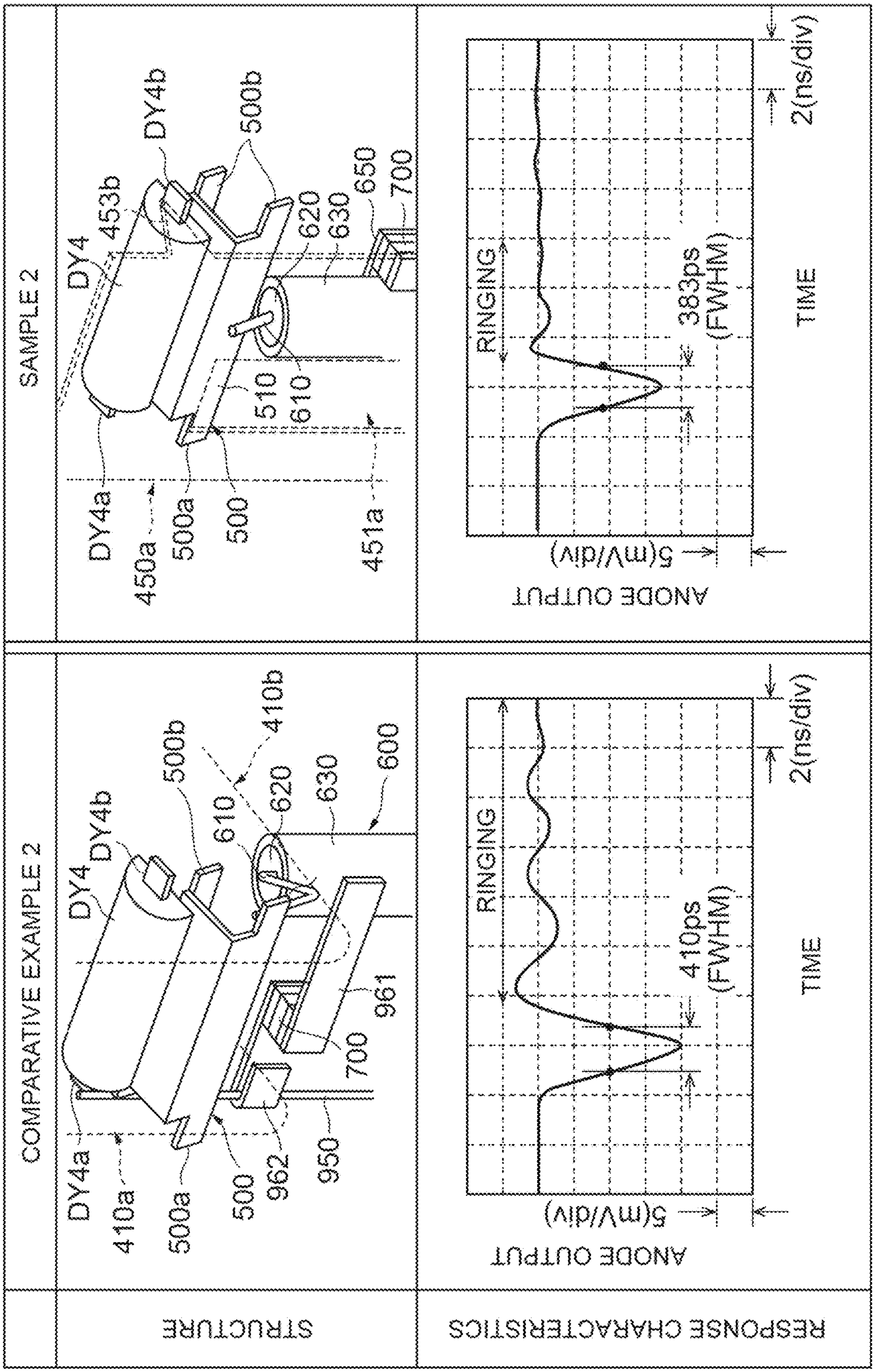
FIG. 9 is a diagram illustrating a difference in ringing suppression effect between Sample 2 adopting the structural features of the photoelectron multiplier according to the present embodiment and Comparative Example 2.

In order to confirm the above-described technical effect regarding the photoelectron multiplier 100 according to the present embodiment, it will be described with reference to FIGS. 8 and 9 that the response characteristics are improved by comparing a sample including the structural features of the photoelectron multiplier 100 according to the present embodiment with a comparative example. FIG. 8 is a diagram illustrating a difference in response characteristics between Sample 1 partially adopting the structural features of the photoelectron multiplier according to the present embodiment and Comparative Example 1. FIG. 9 is a diagram illustrating a difference in ringing suppression effect between Sample 2 adopting the structural features of the photoelectron multiplier 100 according to the present embodiment and Comparative Example 2. Note that the structures of Sample 1, Sample 2, Comparative Example 1, and Comparative Example 2 illustrated in FIGS. 8 and 9 are illustrated only in the main part, and the configuration not illustrated in any of the photoelectron multipliers is similar to the above-described configuration.

FIG. 8 shows the structure and response characteristics of Comparative Example 1 and the structure and response characteristics of Sample 1 of the present embodiment. In FIG. 8, as the structures of Comparative Example 1 and Sample 1, the fourth-stage dynode DY4 and the anode 500 in a state of being gripped by the first and second insulating support members 410*a* and 410*b* are illustrated. In Comparative Example 1, although one end portion of the coaxial cable 600 is drawn into the sealed container 110 via the stem 110*b*, the exposed portion of the inner conductor 610 is directly resistance-welded to the fixing piece 500*b* of the anode 500 protruding from the outside of the insulating support member 410*b*. Thus, the length of the exposed portion of the inner conductor 610 is adjusted to 10 mm.

On the other hand, in Sample 1, one end portion of the coaxial cable 600 is drawn into the space interposed between the first and second insulating support members 410*a* and 410*b* via the stem 110*b*, and the exposed portion of the inner conductor 610 exposed from the end portion of each of the glass material 620 and the outer conductor 630 by 2 mm is resistance-welded to the fixing surface 510 of the anode 500.

In the photoelectron multiplier according to Comparative Example 1 having the above-described structure, a full width at half maximum (FWHM) of the waveform of the obtained anode output was 410 ps. On the other hand, in the photoelectron multiplier according to Sample 1, a full width at half maximum (FWHM) of the waveform of the obtained anode output was 383 ps, and improvement (increase in speed) of the response characteristics could be confirmed.

Next, FIG. 9 illustrates the structure and response characteristics of Comparative Example 2 and the structure and response characteristics of Sample 2 of the present embodiment. In FIG. 9, as the structures of Comparative Example 2 and Sample 2, the fourth-stage dynode DY4 and the anode 500 in a state of being gripped by the first and second insulating support members 410*a* and 410*b* are illustrated. However, in the configuration of Comparative Example 2, although one end portion of the coaxial cable 600 is drawn into the sealed container 110 via the stem 110*b*, the exposed portion of the inner conductor 610 is positioned outside the space interposed between the first and second insulating support members 410*a* and 410*b*. Thus, the exposed portion of the inner conductor 610 has a length of 10 mm, and the exposed portion and the fixing piece 500*b* of the anode 500 (a portion protruding to the outside of the insulating support member 410 *b*) are resistance-welded. One external electrode of the capacitor 700 housed in the sealed container 110 is bonded and fixed to one end portion of a metal plate 961 via a silver paste, and the other end portion of the metal plate 961 is resistance-welded to the outer peripheral surface of the outer conductor 630. One end portion of a metal plate 962 is bonded and fixed to the other external electrode of the capacitor 700 via a silver paste. The other end portion of the metal plate 962 is resistance-welded to a lead pin 950 for voltage supply of which one end is resistance-welded to the fixing piece DY4*a* of the fourth-stage dynode DY4.

On the other hand, the photoelectron multiplier according to Sample 2 includes a shield electrode set to the same potential as the potential of the fourth-stage dynode DY4. In Sample 2, one end portion of the coaxial cable 600 is drawn into the space interposed between the first and second insulating support members 410*a* and 410*b* via the stem 110*b*, and the exposed portion having a length of 2 mm of the inner conductor 610 exposed from the end portion of each of the glass material 620 and the outer conductor 630 is resistance-welded to the fixing surface 510 of the anode 500. One external electrode of the capacitor 700 is bonded and fixed to one end portion of the metal plate 660 via a silver paste. The other end portion of the metal plate 660 is resistance-welded to the shield electrode 450. The other external electrode of the capacitor 700 is bonded and fixed to one end portion of the metal plate 650 via a silver paste. The other end portion of the metal plate 650 is resistance-welded to the outer peripheral surface of the outer conductor 630.

When the waveforms of the anode outputs of the photoelectron multipliers of Comparative Example 2 and Sample 2 having the above-described structure are compared, it can be confirmed that the ringing suppression effect clearly appears in the waveform of the anode output of Sample 2.

From the above description of the present invention, it is apparent that the present invention can be variously modified. Such modifications cannot be regarded as departing from the spirit and scope of the present invention, and improvements obvious to all those skilled in the art are included in the following claims.

REFERENCE SIGNS LIST

100 photoelectron multiplier
110 sealed container
110*a* main body
110*b* stem
120 cathode
140 lead pin
200 focusing electrode
300 acceleration electrode
400 dynode unit
DY4 fourth-stage dynode (final-stage dynode)
410*a* first insulating support member
410*b* second insulating support member
450 shield electrode (example of conductive member)
451*a*, 451 *b* notch portion (constituting through-hole)
500 anode
520 electrode member
600 coaxial cable
610 inner conductor
620 glass material (example of insulating material)
630 outer conductor
700 capacitor
800, 800*a*, 800*b* conductive member

The invention claimed is:

1. An electron multiplier comprising:

a dynode unit configured to cascade-multiply an electron and extracts the electron as an electric signal, the dynode unit including multiple-stage dynodes, an anode which is set to a potential higher than a set potential of a final-stage dynode among the multiple-stage dynodes and captures the electron emitted from the final-stage dynode, and a pair of insulating support members which integrally grip both at least the multiple-stage dynodes and the anode;

a stem having a first surface and a second surface facing the first surface and holds the dynode unit in a first-surface side space positioned on an opposite side of the second surface to the first surface;

a coaxial cable having an inner conductor, an insulating material provided on an outer peripheral surface of the inner conductor, and an outer conductor provided on an outer peripheral surface of the insulating material, the coaxial cable having at least one end portion provided in the first-surface side space;

a conductive member provided in the first-surface side space, the conductive member being provided on the same potential as a potential of the final-stage dynode which directly supplies the multiplied electron to the anode; and a capacitor provided in the first-surface side space, the capacitor being arranged on a wiring between the conductive member and the outer conductor of the coaxial cable, wherein an exposed portion of the inner conductor constituting a part of the one end portion of the coaxial cable and positioned in the first-surface side space in a state of being exposed from end portions of the insulating material and the outer conductor is fixed to a portion of the anode interposed between the pair of insulating support members.

2. The electron multiplier according to claim 1, wherein the end portion of the outer conductor together with the exposed portion of the inner conductor is positioned in a space interposed between the pair of insulating support members.

3. The electron multiplier according to claim 1, wherein when a side where the stem is located is viewed from the dynode unit side along a direction directed to the second surface from the first surface, the dynode unit is arranged such that the portion of the anode interposed between the pair of insulating support members overlaps a portion of the first surface on which the coaxial cable is arranged.

4. The electron multiplier according to claim 1, wherein the stem holds a plurality of lead pins, and the conductive member has a cross-sectional area larger than a cross-sectional area of each of the plurality of lead pins, and is set to the same potential as a potential of the final-stage dynode by a first portion of the conductive member being fixed to the final-stage dynode.

5. The electron multiplier according to claim 1, wherein the capacitor has one external electrode fixed to a second portion of the conductive member and the other external electrode electrically connected to the outer conductor of the coaxial cable.

6. The electron multiplier according to claim 1, wherein the conductive member includes a shield electrode attached to the pair of insulating support members, and the shield electrode has an opening through which the end portion of the outer conductor penetrates from the stem toward the anode together with the exposed portion of the inner conductor.

7. The electron multiplier according to claim 6, wherein the capacitor is positioned in a space between the shield electrode and the stem.

8. The electron multiplier according to claim 1, wherein the capacitor includes a ceramic capacitor.

9. A photoelectron multiplier comprising:

the electron multiplier according to claim 1;

a cathode configured to emit a photoelectron toward the dynode unit in response to a light input; and a sealed container including a main body having an opening end extending along a central axis and defining an opening intersecting the central axis, the main body housing at least the cathode and the dynode unit, and a stem portion functioning as the stem, the stem portion being in close contact with the opening end in a state of closing the opening end, wherein the coaxial cable is held by the stem portion in a state where the other end portion of the coaxial cable penetrates the stem from the first surface toward the second surface.

* * * * *